United States Patent [19]

Funk et al.

[11] 4,254,437
[45] Mar. 3, 1981

[54] IMAGE INTENSIFIER ATTACHMENT FOR ATTACHMENT TO THE FRONT LENS OF A TELEVISION CAMERA

[75] Inventors: Hans-Wolfgang Funk, Hirschberg; Bernd Engel, Gross-Gerau, both of Fed. Rep. of Germany

[73] Assignee: Proxitronic Funk GmbH & Co. KG, Darmstadt, Fed. Rep. of Germany

[21] Appl. No.: 53,264

[22] Filed: Jun. 29, 1979

[30] Foreign Application Priority Data

Jun. 29, 1978 [DE] Fed. Rep. of Germany ....... 2828479

[51] Int. Cl.³ .............................................. H04N 5/30
[52] U.S. Cl. .................................. 358/211; 250/213 R
[58] Field of Search ........ 250/213 R, 213 A, 213 VT; 358/209, 213, 225, 211

[56] References Cited

U.S. PATENT DOCUMENTS

| | | | |
|---|---|---|---|
| 3,553,363 | 1/1971 | Anderson | 358/211 |
| 3,737,667 | 6/1973 | Babb | 250/213 R |
| 3,752,983 | 8/1973 | Yanez | 250/213 R |
| 3,790,785 | 2/1974 | Paolini | 250/213 R |
| 3,813,489 | 5/1974 | Ramsey | 358/211 |
| 3,974,331 | 8/1976 | Pepin | 358/211 |
| 4,067,045 | 1/1978 | Provost | 358/211 |

*Primary Examiner*—Jin F. Ng
*Assistant Examiner*—Michael Allen Masinick
*Attorney, Agent, or Firm*—Quaintance, Murphy & Richardson

[57] ABSTRACT

In order to increase the sensitivity of television cameras so as to allow the cameras to operate in low level light, an image transformer attachment, in the form of an ancillary image intensifier, is provided for attachment to the objective lens opening of the camera. The attachment includes a cylindrical housing containing one or more proximity-focus image converters or intensifiers which are optically connected to the pick-up tube of the camera by a fiber optics cylindrical block. The housing includes an annular disk screwed into its input end, which disk has an opening for the objective lens of the camera and which disk urges a resilient ring against the image transformers to bias the intensifier and fiber optics block against the pick-up tube of the camera. At its output end, the camera has another annular disc with a threaded projection thereon, which projection is received in the threaded opening normally holding the objective lens of the camera to retain the attachment housing in fixed relation with respect to the camera while the first disk is screwed into the housing.

20 Claims, 2 Drawing Figures

IMAGE INTENSIFIER ATTACHMENT FOR ATTACHMENT TO THE FRONT LENS OF A TELEVISION CAMERA

BACKGROUND OF THE INVENTION

To date, it has been the custom in low light level television cameras to provide an image intensifier which is coupled through fiber optics and located in front of the television camera pick-up tube. This configuration necessitates special modification of standard television camera housings to accomodate the attachments. Moreover, these modifications require considerable effort in order to convert standard cameras into low light level cameras. Accordingly, there is a need for an image intensifier front lens attachment which can optionally be attached to normal television cameras in order to expand the sensitivity thereof without modifying the camera structure.

In utilizing image intensifiers with television cameras, or any type of camera in which photoelectric effects are a consideration, the intensifiers should be shielded and electrically isolated. This is because the intensifiers generally utilize voltages in the range of 1500...4500 volts which can adversely affect other equipment if allowed to leak.

While these considerations are especially pertinent to television cameras they also apply to other types of cameras and photoelectric devices.

SUMMARY OF THE INVENTION

In view of the foregoing considerations, it is an object of the instant invention to provide a new and improved means for converting television cameras to low light level cameras.

In view of this object, and other objects, the instant invention contemplates an image transfer attachment for television cameras wherein the attachment is positioned between an objective lens exterior of the housing for the television camera and a pick-up tube within the housing of the television camera. The attachment includes an image intensifier mounted in an attachment housing wherein the attachment housing has an input and an output end, the input end having an opening therethrough for receiving the objective lens and the output end having an opening for alignment with the pick-up tube. The attachment is rigidly attached to the television housing and a resilent member is disposed between the input end of the attachment housing and the image intensifier. A cylindrical fiber optics block projects through the opening in the output end of the attachment housing and between the image intensifier and pick-up tube. The resilent member biases the image intensifier and cylindrical fiber optics block toward the pick-up tube so as to hold the cylinderical fiber optics block against the pick-up tube.

DESCRIPTION OF THE PREFERRED EMBODIMENT

Figure 1:
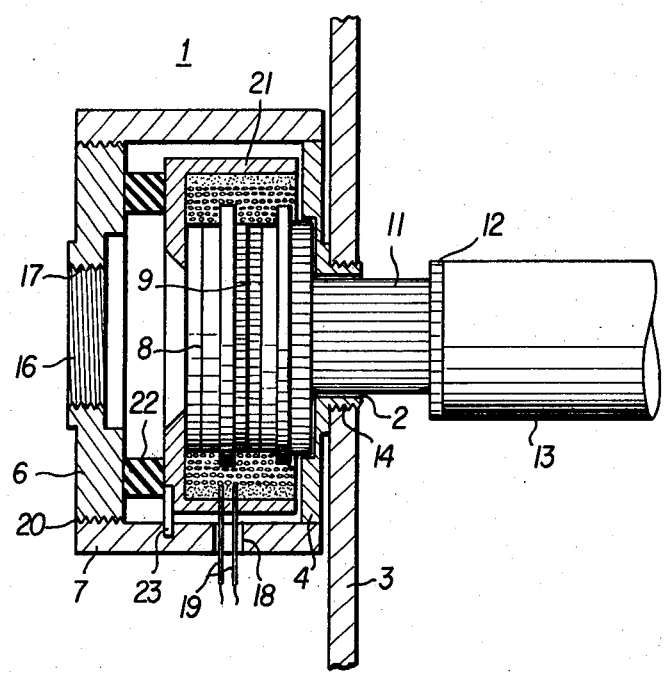
FIG. 1 is a vertical cross-section of an attachment according to the instant invention, wherein the attachment is shown attached to the front of a television camera housing and television camera pick-up tube.

Referring now to FIG. 1 of the drawing, an image intensifying, front-lens attachment 1 is shown screwed into an opening 2 through a front face 3 of a housing or casing for an image processing apparatus, which in the preferred embodiment is a television camera. The opening 2 normally supports the objective lens of the television camera. The attachment 1 includes a cylindrical attachment housing having an annular disk 4 at the output thereof and an annular disk 6 at the input end thereof. A cylindrical mantel 7 connects the two disks 6 and 7 to form the housing. Two proximity-focus image transformers, in the form of cascaded input and output image intensifiers elements 8 and 9, respectively, are disposed within the attachment housing and are optically coupled with a front plate 12 of a pick-up tube 13. This optical coupling is effected by a cylindrical glass fiber optics block 11. The fiber optics block 11 is preferably adhered or otherwise secured to the output image intensifier element 9 to form a unit therewith.

The glass fiber optics block 11 is fiber coupled with the output fiber window of the image intensifier 9 and preferably forms a single unit with the image intensifier 9. The glass fiber optics block 11, does not increase the target capacity of the pick-up tube 12, consequently, signal-to-noise ratio deterioration does not occur due to the coupling therebetween.

Figure 2:
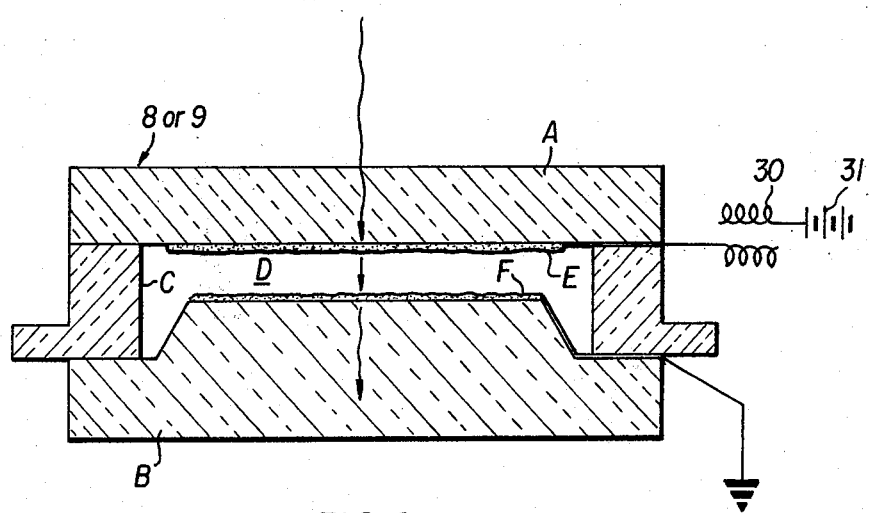
FIG. 2 is a cross-sectional through a proximity focus image intensifier element of the prior art which is included in the assembly of the instant invention.

The structure of each of the elements 8 and 9 is shown in the schematic prior art illustration of FIG. 2, wherein a pair of plates A and B are separated by a spacer C to form an evacuated space D. Photoelectric coatings E and F are deposited on both plates A and B and a potential of up to 21,000 VDC is applied across the gap therebetween. Cascaded image intensifier tubes consist of a clear input window, bearing the first photocathode; all other windows are of fiber plates for coupling from stage to stage and to the fiber block at the output. Since the vacuum in space D is on the order of $10^{-8}$ torr, when photons strike coating E electrons will be emitted therefrom and accelerated by the electric potential toward the coating F. When the electrons strike the coating F, numerous photons are emitted from the coating F thereby intensifying emitted light by increasing the number of photons emitted from the element for each photon striking the element.

The disk 4 has an external thread on an annular projection or collar 14 which projection is screwed into a complementary thread in the opening 2 of the television camera housing 3. Normally, the opening 2 accomodates the objective lens of the television camera, which lens is removed when the attachment 1 is mounted to convert the camera to a low light level camera. The input end annular disk 6 has an opening 16 with an inside thread 17 into which a recording objective lens (not shown) is screwed. The opening 16 is preferably large enough to accept high-power objective lenses. The cylindrical mantel 7 has threads for fastening the disk 6 therein and an opening 18 therethrough for passage of operating voltage cables 19 for the image intensifiers 8 and 9. The disk 6 is retained in the mantel 7 by screw threads 20 while the disk 4 is fastened to the mantel by machine screws (not shown) to form a rigid structure therewith. In order to provide good optical contact between the block 11 and the fiber disk 12, a resilent annular element 22 which may be, for example, a foam rubber gasket or perhaps individual foam rubber components, is positioned between the front annular disk 6 and a potting casing 21 within which the image intensifiers 8 and 9 are contained.

In securing the image intensifiers front lens attachment 1, in accordance with this invention, to a television camera, the disk 4 is first screwed into the opening 2 until a portion abuts the camera housing in order to rigidly position the disk 4 with respect to the camera housing. The image intensifier component units (consisting of image intensifiers 8 and 9 and the potting casing 21, plus the fiber optics block 11) is then inserted through the opening in the center of annular disk 4 so that the fiber optics block 11 abuts the fiber input window 12 of the pick-up tube 13. The cylinderical mantel 7 is then aligned with the annular disk 4, slipped thereover and secured thereto with machine screws. Annular disk 6 is then screwed into the cylindrical mantel 7. Consequently, the image intensifier components 8, 9, 21, and 11 are supported in alignment with the disk 12, on the pick-up tube 13. In order to keep the fiber block 11 in radial position, the diameter of the fiber optics block 11 is slightly less than the opening through the annular disk 4. Moreover, there is a slight space between the potting housing 21, and the annular disk 4 when the block 11 is against the disk 12. All axial contact between the various image intensifier components 8, 9, 11, and 21 and the annular disk 4 is therefore avoided, and the image intensifier components are suspended between the resilient ring 22 and pick-up tube 13.

In order to prevent twisting of the image intensifier unit (components 8, 9, 11, and 21) during assembly as the annular disk 6 is rotated, a pin 23 is provided which extends between the image intensifier unit and a short slot 24 in the mantel 7. If it is desired to insert an intermediate disk, the intermediate disk can also be configured in such a manner that it is prevented from twisting both with respect to the image intensifier unit (components 8, 9, 11, and 21) and the disk 6.

If it is desired that the image intensifier unit contain only one of the image intensifiers 8 or 9, the front lens attachment housing can be made shorter. If needed, to produce a high voltage out of a low battery voltage a free swinging oscillator and high voltage multiplier (not shown), which produces the high voltage for the operation of the image intensifiers 8 and 9 can be accomodated in the space between the disk 6 and the amplifier unit. Because the housing of the front lens attachment 1 consists of metal or metalized plastic, there is no danger that a moiré pattern interface will develop in the image of the camera monitor if an oscillator is included.

It would be within the scope of this invention for each individual image intensifier to be cast into a voltage multiplier ring. For the purpose of further shielding the entire outer surface of the image intensifier unit (consisting of elements 8, 9, 11, and 21), the entire unit is coated, if desired, with an electrically conductive coating. The coating is connected to ground and is optically transparent in required zones at axial ends of the elements where light transmission is necessary between components of the image intensifier unit and the television camera.

Preferably, but not necessarily, the casing 21 includes a transformer 30 sealed therein with potting material. While the transformer 30 is illustrated as a toroidal transformer, it may have any convenient configuration. As is seen in FIG. 2, the transformer 30 is preferably used to step-up voltage from a battery 31, which may have an output of for example 1.0–2.6 volts, to a voltage level which may be as high as approximately 21,000/or 42,000 volts D.C. if necessary or desired.

The attachment of the aforedescribed proximity-focus image intensifier, according to the instant invention, is advantageous because in coupling the image intensifier to the pick-up tube, a precise coincidence of two optical axises need not be taken into consideration due to the fact that a proximity focus image intensifier has absolutely no shading (normal inverter image intensifier have pronounced edge shading due to plane concave fiber window). Moreover, the front lens attachment, according to the instant invention, is not restricted to one image intensifier but may be equipped with two or more image intensifiers. Consequently, the sensitivity of the camera can be increased to the point where the camera can be used as a low light level camera. In practice, intensification values in the range of 1 to 35,000 fl/fc (gain of 14 aperture stops) is attainable. Through the use of a quartz or saphire disk as the input window of the image intensifier, a spectral range from ultra-violet wavelengths to near infra-red wavelengths is possible.

While the attachment 1 is disclosed in combination with a television pick-up tube 13, the attachment may be used with other optical, photographic or photoelectric devices, systems or image receptors. For example, the attachment 1 or the intensifier unit (components 8, 9, 11, and 21) by itself could be used with astronomical instruments and cameras to intensify the weak light arriving from stars, planets, comets and the like.

While the aforedescribed embodiment is illustrative of the instant invention, the invention is to be limited only by the following claims.

We claim:

1. An image intensifier attachment for a television camera, wherein the attachment is positioned between an objective lens located exterior of a housing for the television camera and a pick-up tube within the housing, and wherein the attachment is retained in a standard threaded aperture in the housing ordinarily used for an objective lens, the attachment comprising:

image intensifier means;

an attachment housing for containing the image intensifier, the attachment housing having an input end and an output end, the input end having an opening therethrough for receiving the objective lens and the output end having an opening for alignment with the pick-up tube;

an exteriorly threaded annulus means on the attachment housing for securing the attachment housing in the standard threaded aperture in the television camera housing;

resilient means disposed between the input end of the attachment housing and the image intensifier means, and a fiber optics block disposed through the opening in the output end of the attachment housing between the image intensifier means and pick-up tube; said fiber optics block having a length greater than the distance between the pick-up tube and the output end of the housing wherein there is a space between the image intensifier means and the output end of the housing whereby the resilient means biases the fiber optics block against the pick-up tube means by bearing against the image intensifier means.

2. The attachment of claim 1 wherein the image intensifier means includes a plurality of serially aligned image intensifiers.

3. The attachment of claim 2 wherein the image intensifiers are potted within a potting casing disposed within the attachment housing and wherein the resilient means abuts the potting casing.

4. The attachment of claim 1 wherein the image intensifier means includes one or more separate image intensifiers and wherein the image intensifier means further includes a potting casing therearound, which potting casing is abutted by the resilient means.

5. The attachment of claim 4 wherein the attachment housing includes a cylindrical mantle with internal threads adjacent to the input end of the attachment housing and wherein the input end of attachment housing comprises an annular disk with external threads which complement the internal threads of the cylindrical mantle.

6. The attachment of claims 1 or 4 wherein the resilient means is a rubber ring.

7. The attachment of claim 4 wherein the resilient means comprises a plurality of rubber members distributed over the axial end of the sealing casing opposed to the input end of the attachment housing.

8. The attachment of claim 1 or claim 4 further including means disposed between the attachment housing and image intensifier means to prevent rotation of the housing and image intensifier with respect to one another.

9. The attachment of claims 1 or 4 wherein the image intensifier means includes leads extending therefrom and wherein the attachment further includes an opening through the housing through which leads from the image amplifier means pass.

10. The attachment of claim 1 or 4 wherein the attachment housing is made of metal.

11. The attachment of claim 1 or 4 wherein the housing is made of metallized plastic.

12. The attachment of claim 1 or claim 5 further including an annular high voltage generator disposed within the housing.

13. The attachment of claim 4 further including an annular high voltage generator integrated within the potting casing.

14. The attachment of claim 1 or 3 wherein the fiber optics block is integral with at least one of the image intensifiers.

15. The attachment of claim 5 wherein the cylindrical mantel has an axial length which depends upon the number of image intensifiers included in the image intensifiers means.

16. The attachment of claim 5 wherein the annular disk which forms the input end of the attachment housing includes means for locking the disk against rotation when a required degree of seating pressure against the transformer is reached.

17. The attachment of claim 1 or claim 4 wherein the image intensifier means and fiber glass block are surrounded by an electrically conducting ground coating which coating is optically transparent at least at the axial ends thereof.

18. An image intensifier attachment for image processing apparatus having an image receptor therein, wherein the apparatus has a casing with a threaded opening therethrough aligned with the image receptor for receiving an objective lens, the attachment comprising:

image intensifier means;
a housing for containing the image intensifier means wherein the housing has an input and an output end, the input end having an opening therethrough for receiving an objective lens and the output end having an opening for alignment with the opening in the apparatus casing, wherein the opening in the output end includes an externally threaded collar complementing the threaded opening in the apparatus casing for retaining the collar and thus the housing and image intensifier means on the image processing apparatus when the objective lens is removed from the opening in the casing;
resilient means disposed between the input end of the attachment housing and the image intensifier means for urging the image intensifier means toward the output end of the housing; and
fiber optic light transmission means disposed between the image intensifier means and image receptor means, the fiber optic means being urged against the image receptor means by the resilient means.

19. The apparatus of claim 18 wherein the receptor is a pick-up tube for a television camera.

20. An image intensifier attachment for a television camera having a threaded opening which normally retains an objective lens, the attachment being positioned between an objective lens located exterior of a housing for the television camera and a pick-up tube within the housing and aligned with the threaded opening, the attachment comprising:

(a) an image intensifier unit comprising: input and output intensifier elements arranged in series with one another; a transformer for stepping-up the voltage supplied to the elements, the transformer having leads extending therefrom; a casing containing the elements and transformer; potting material for retaining the elements and transformer within the casing, and fiber optic block means secured to the output element for transmitting light from the output element, the fiber optics block means having a length greater than the distance between the pick-up tube and outside surface of the camera housing;

(b) a cylindrical housing made of shielding material for containing the image intensifier unit, the cylindrical housing having an input end defined by a threadably mounted annular disk with provision for mounting an objective lens coaxial therewithin; the cylindrical housing further having an output end defined by an annular disk with an externally threaded collar for threadably mounting the housing in the threaded opening of the camera housing which usually receives the objective lens and having a thickness which when added to the surface of the camera housing defines a distance from the pick-up tube which is less than the length of the fiber optics block means; and an opening through the housing for passage of the leads from the transformer whereby low voltage power can be transmitted through the cylindrical housing to the transformer; and means for preventing rotation of the image intensifier unit with respect to the cylindrical housing;

(c) a resilient annular member disposed between the threaded disk and intensifier unit whereby when the cylindrical housing is mounted within the threaded opening with the fiber optics block means in engagement with the pick-up tube, rotation of the threaded disk compresses the resilient ring against the intensifier unit to hold the intensifier unit suspended between the pick-up tube and resilient means in electrical isolation with respect to the cylindrical housing while being shielded by the housing.

* * * * *

UNITED STATES PATENT OFFICE
CERTIFICATE OF CORRECTION

Patent No. 4,254,437　　　　　　　　Dated March 3, 1981

Inventor(s) Hans-Wolfgang Funk et al.

It is certified that error appears in the above-identified patent and that said Letters Patent are hereby corrected as shown below:

Column 1, Line 26, should read:

generally utilize voltages in the range of 15000...45000

Signed and Sealed this

Fourteenth Day of July 1981

[SEAL]

*Attest:*

*Attesting Officer*

GERALD J. MOSSINGHOFF

*Commissioner of Patents and Trademarks*